(12) United States Patent
Friedrich et al.

(10) Patent No.: US 11,796,001 B2
(45) Date of Patent: Oct. 24, 2023

(54) METHOD OF FORMING A BEARING CAGE SEGMENT INCLUDING A JOINT EDGE IN THE REGION OF A TO-BE-FORMED BRIDGE

(71) Applicant: AKTIEBOLAGET SKF, Gothenburg (SE)

(72) Inventors: Hans-Juergen Friedrich, Königsberg-Römershofen (DE); Norbert Huhn, Schweinfurt (DE); Thomas Kettner, Bamberg (DE); Manfred Mattes, Kolbingen (DE); Harald Metz, Randersacker (DE); Achim Mueller, Dittelbrunn (DE); Alfred Radina, Poppenlauer (DE); Jonas Schierling, Hassfurt (DE); Maximilian Soellner, Bundorf (DE); Markus Volkmuth, Werneck-Zeuzleben (DE)

(73) Assignee: AKTIEBOLAGET SKF, Gothenburg (SE)

( * ) Notice: Subject to any disclaimer, the term of this patent is extended or adjusted under 35 U.S.C. 154(b) by 225 days.

(21) Appl. No.: 17/350,081

(22) Filed: Jun. 17, 2021

(65) Prior Publication Data

US 2021/0310519 A1 Oct. 7, 2021

Related U.S. Application Data

(63) Continuation of application No. 16/778,135, filed on Jan. 31, 2020, now abandoned.

(30) Foreign Application Priority Data

Feb. 7, 2019 (DE) ..................... 10 2019 201 565.4

(51) Int. Cl.
*F16C 33/54* (2006.01)
*F16C 33/46* (2006.01)
(Continued)

(52) U.S. Cl.
CPC ........ *F16C 33/543* (2013.01); *B23K 11/0873* (2013.01); *B23K 26/262* (2015.10);
(Continued)

(58) Field of Classification Search
CPC ................ F16C 33/543; F16C 33/4694; F16C 33/541; F16C 33/545; F16C 2220/60;
(Continued)

(56) References Cited

U.S. PATENT DOCUMENTS 2,269,224 A 1/1942 Reilly
2,591,160 A 4/1952 Kilian
(Continued)

FOREIGN PATENT DOCUMENTS

CN 103415717 A 11/2013
CN 104475350 A 4/2015
(Continued)

OTHER PUBLICATIONS

LaserJob, Inc., Laser Material Processing, Oct. 2012, p. 2 (Year: 2012).
(Continued)

*Primary Examiner* — Sarang Afzali
*Assistant Examiner* — Darrell C Ford
(74) *Attorney, Agent, or Firm* — J-TEK LAW PLLC; Scott T. Wakeman; Mark A. Ussai

(57) ABSTRACT

A method of forming a bearing cage segment includes punching a plurality of openings in a sheet metal band to form a plurality of pockets separated by a plurality of bridges, the bridges having a length direction transverse to a length direction of the band and having a width in the (Continued)

length direction of the band and having a thickness in a direction perpendicular the length direction and to the width, and laser cutting the sheet metal band along one of the plurality of bridges transversely to the length direction of the band to form a joint edge.

20 Claims, 2 Drawing Sheets

(51) Int. Cl.
*B23P 15/00* (2006.01)
*B23K 26/38* (2014.01)
*B23K 11/087* (2006.01)
*B23K 26/262* (2014.01)

(52) U.S. Cl.
CPC ............ *B23K 26/38* (2013.01); *B23P 15/003* (2013.01); *F16C 33/4694* (2013.01); *Y10T 29/49691* (2015.01)

(58) Field of Classification Search
CPC .............. F16C 2220/84; F16C 2226/36; F16C 33/502; F16C 33/542; F16C 33/548; B23K 11/0873; B23K 26/262; B23K 26/38; B23P 15/003; Y10T 29/49691; Y10T 29/49636; Y10T 29/49679
USPC ............................... 29/898, 898.06, 898.067
See application file for complete search history.

(56) References Cited

U.S. PATENT DOCUMENTS

| | | |
|---|---|---|
| 3,202,467 A | 8/1965 | Karl-Albert |
| 3,313,582 A | 4/1967 | Henry |
| 3,353,246 A | 11/1967 | Farmer |
| 3,356,428 A | 12/1967 | Ralph |
| 3,365,775 A | 1/1968 | Cavagnero et al. |
| 3,473,857 A | 10/1969 | Pitner |
| 3,526,026 A | 9/1970 | Warchol |
| 3,605,247 A | 9/1971 | Bingle et al. |
| 3,626,565 A | 12/1971 | Koch |
| 3,820,867 A | 6/1974 | Dickinson et al. |
| 3,902,772 A | 9/1975 | Spate |
| 3,992,764 A | 11/1976 | Serasio |
| 4,397,507 A | 8/1983 | Kraus et al. |
| 4,577,088 A | 3/1986 | Sharp |
| 4,821,386 A | 4/1989 | Simon et al. |
| 4,942,652 A * | 7/1990 | Hazebrook ............ F16D 3/223 29/898.067 |
| 5,187,345 A | 2/1993 | Alling et al. |
| 5,199,170 A * | 4/1993 | Mori ..................... F16C 41/008 29/898 |
| 5,255,985 A | 10/1993 | Alling |
| 5,528,706 A | 6/1996 | Harimoto et al. |
| 5,795,080 A | 8/1998 | Fujiwara et al. |
| 6,330,748 B1 | 12/2001 | Müntnich et al. |
| 6,752,535 B2 | 6/2004 | Krochak |
| 6,883,968 B2 | 4/2005 | Fugel et al. |
| 6,955,476 B1 | 10/2005 | Murai |
| 7,571,706 B2 | 8/2009 | Ichikawa et al. |
| 8,696,210 B2 | 4/2014 | Kawai et al. |
| 8,770,854 B2 | 7/2014 | Friedrich et al. |
| 9,239,077 B2 | 1/2016 | Doki-Thonon et al. |
| 9,382,947 B2 | 7/2016 | Ishibashi |
| 9,429,194 B2 | 8/2016 | Reimchen |
| 9,512,881 B2 | 12/2016 | Katayama et al. |
| 9,551,377 B2 | 1/2017 | Haas et al. |
| 11,149,793 B2 | 10/2021 | Friedrich et al. |
| 2007/0248298 A1 | 10/2007 | Chihara |
| 2008/0245631 A1 | 10/2008 | Bochen et al. |
| 2013/0034321 A1 | 2/2013 | Beck et al. |
| 2013/0308890 A1 | 11/2013 | Steblau et al. |
| 2015/0159696 A1* | 6/2015 | Manne .................... F16C 33/46 384/523 |
| 2016/0017919 A1 | 1/2016 | Haas et al. |
| 2019/0226528 A1* | 7/2019 | Hainz .................... F16D 3/223 |
| 2021/0372475 A1 | 12/2021 | Friedrich et al. |

FOREIGN PATENT DOCUMENTS

| | | |
|---|---|---|
| CN | 104847794 A | 8/2015 |
| CN | 104847795 A | 8/2015 |
| CN | 105605100 A | 5/2016 |
| CN | 106271725 A | 1/2017 |
| CN | 206215979 U | 6/2017 |
| CN | 107120357 A | 9/2017 |
| DE | 2111081 A1 | 9/1972 |
| DE | 3130610 A1 | 2/1983 |
| DE | 19910928 A1 | 9/2000 |
| DE | 10065169 A1 | 7/2002 |
| DE | 102006045436 A1 | 3/2008 |
| DE | 102009017751 A1 | 10/2010 |
| DE | 102012221097 A1 | 5/2014 |
| DE | 102015210924 A1 | 7/2016 |
| DE | 102015206533 A1 | 10/2016 |
| DE | 102016201052 A1 | 7/2017 |
| DE | 102016216286 A1 | 3/2018 |
| DE | 102016222336 A1 | 5/2018 |
| DE | 102019115335 A1 | 12/2020 |
| EP | 0074803 A1 | 3/1983 |
| EP | 2839175 B1 | 5/2016 |
| FR | 2234483 A1 | 1/1975 |
| FR | 2514440 A1 | 4/1983 |
| FR | 2612102 A1 | 9/1988 |
| FR | 3013087 A1 | 5/2015 |
| GB | 1431612 A | 4/1976 |
| GB | 2103307 A | 2/1983 |
| JP | H0742744 A | 2/1995 |
| JP | H0742744 U | 8/1995 |
| JP | 07317773 A | 12/1995 |
| JP | H07317773 A | 12/1995 |
| JP | H08270658 A | 10/1996 |
| JP | 2005076697 A | 3/2005 |
| JP | 2006064044 A | 3/2006 |
| JP | 2007247856 A | 9/2007 |
| JP | 20082156515 A | 9/2008 |
| JP | 4786124 B2 | 10/2011 |
| JP | 2013007435 A | 1/2013 |
| JP | 2013108587 A | 6/2013 |
| JP | 2017026083 A | 2/2017 |
| JP | 6197844 B2 | 9/2017 |
| NL | 6910823 A | 3/1970 |
| WO | 2008040290 A1 | 4/2008 |
| WO | 2014136816 A1 | 9/2014 |
| WO | 2015022355 A1 | 2/2015 |
| WO | 2018109784 A1 | 6/2018 |

OTHER PUBLICATIONS

Unpublished U.S. Appl. No. 18/091,491, Berthold Beyfuss, filing date: Dec. 30, 2022.
Office Action from the United States Patent Office dated Mar. 2, 2023 in related U.S. Appl. No. 17/400,177.

* cited by examiner

METHOD OF FORMING A BEARING CAGE SEGMENT INCLUDING A JOINT EDGE IN THE REGION OF A TO-BE-FORMED BRIDGE

CROSS-REFERENCE

This application is a continuation of U.S. Ser. No. 16/778,135, filed Jan. 31, 2020, which application claims priority to German patent application no. 10 2019 201 565.4 filed on Feb. 7, 2019, the contents of which are fully incorporated herein by reference.

TECHNOLOGICAL FIELD

The present disclosure is directed to a method of forming a bearing cage segment of a sheet metal cage having an improved joint edge for welding and to a method of forming a sheet metal cage including such a bearing cage segment.

BACKGROUND

Bearing cages are known from the prior art that are composed of one or more rounded cage segments, made of sheet metal, that are respectively connected to one another at their joint edges, for example by welding.

Here it is known to produce the structure and contour of such bearing cage segments by punching and stamping. For this purpose in a first step a metal band is intermittently moved along in the longitudinal direction, wherein transversely extending slots are formed by a punch press. In a further step the metal band is cut to length using a transverse cutting device so that a ladder-shaped sheet metal part is formed, wherein the "rungs" of this part form bridges of the bearing cage segment, the slots of the part form pockets of the bearing cage segment, and the "side rails" of the part form the ring sections of the bearing cage segment. In a subsequent step the ring sections are then bent to the desired radius of curvature by round-shaping.

The cutting-to-length is usually effected here in the region of a pocket so that a joint edge is formed on each of the ring sections and a "partial pocket" is formed therebetween. When assembling the bearing cage segment into the finished cage, these joint edges—after a post-processing, which is to be discussed in more detail below—are welded together with two further, analogously formed joint edges, so that a "welding pocket" is formed by the connecting of the "partial pockets."

Cutting-to-length is a punching process in which a combined shear-cutting and breaking occurs. For this reason the joint edges of the ring sections, which joint edges are formed by the cutting-to-length of the metal sheet and are directed in the circumferential direction, are not dimensionally stable enough to be able to serve directly as a welding surface. The post-processing mentioned here is therefore required. In addition, a cutting liquid is typically used during the cutting-to-length which must still be removed afterwards.

The post-processing here is necessarily associated with a material removal. Therefore if after the rounding of the bearing cage segment the post-processed joint edges were to simply be welded to the corresponding joint edges opposing in the circumferential direction, then at this connecting point a welding pocket would be formed which, viewed in the circumferential direction, would have a smaller width than the other pockets. For this reason, according to the prior art, after the cutting-to-size the ring sections are first shortened by approximately a complete pocket width and only then post-processed, so that with respect to the desired pocket width they have the correct length for connecting to the opposing joint edges. The final pocket is lost in this way as waste. Accordingly, in addition to the additional effort of the post-processing, significant material loss also occurs here.

In addition, in the prior art described here the welded joint also represents the weakest point of the finished cage. If such a cage breaks in operation, for example, due to the occurrence of centrifugal forces, the breakage usually occurs at the point of the welded joint. The quality of the welded joint is thus of particular significance since the performance of the finished bearing cage significantly depends thereon.

SUMMARY

It is therefore an aspect of the present disclosure to provide a bearing cage segment that is particularly suitable for producing a reliable connection for forming a bearing cage.

In the following a bearing cage segment of a sheet metal cage, in particular for a needle roller bearing, is provided, which includes a first ring section, at least one second ring section, and a plurality of bridges connecting the first ring section and the at least one second ring section to each other, wherein a pocket for receiving at least one rolling element is respectively formed between the bridges. Here the disclosure is based on the idea that the bearing cage segment includes a joint edge directed in the circumferential direction, which joint edge is configured to be connected to another joint edge, wherein the joint edge is disposed in the region of a bridge to be formed by this connection. In this way, in contrast to the above-mentioned prior art, wherein the weld connection is formed only on the ring sections, an overall enlarged connecting surface can be realized. This is advantageous because the stability of the connection can be increased due to the larger connecting surface. The bearing cage segment is therefore particularly suitable for producing a reliable connection for forming a bearing cage, which is subjected in particular to high loads.

Here the bearing cage segment can be configured for single-row or multi-row bearing cages.

The pockets can subsequently be configured with larger axial extension so that longer rolling elements, that is, for example, longer needles, can be used. In this way the load capacity of a correspondingly formed bearing can be increased so that the bearing is suitable for supporting higher bearing forces. In addition—viewed normal to the circumferential direction—the cross-sections of the ring sections can also in principle be chosen smaller, whereby a corresponding material saving can be achieved.

Furthermore, no end-side partial pocket is formed in the region of the to-be-formed bridge by the design of the joint edge, so that the material loss of the "final pocket" given in the above-mentioned prior art can already be avoided.

According to one exemplary embodiment, the joint edge is formed by laser cutting. The joint edge can be formed so precisely by the laser cutting that it is directly suitable as a welding edge. In this way no post-processing of the welding edge is required for a reliable welding connection. In addition, the bearing cage segment can be individually manufactured by laser cutting, for example, by a cutting-out from a metal sheet, so that the joint edge need not be formed by a cutting-to-length. In this way the material loss, as occurs in the above-mentioned prior art, can also be avoided. The manufacturing is thus made easier.

According to one exemplary embodiment, the joint edge includes a chamfer on the radially outer side and/or the radially inner side. Due to this design, during the production of the welding connection no region forms that projects radially or axially over the respective ring section, in particular no projecting weld seam (so-called upper bead).

A particularly simple manufacturing of the chamfer is made possible when it is formed by a reshaping process, i.e., for example, by rolling or milling.

According to one exemplary embodiment, for the width b, measured in the circumferential direction, of a partial bridge for forming the to-be-formed bridge, it applies that: $0.5 d \leq b \leq d$, wherein d is the width of the bridges measured in the circumferential direction. Due to this choice it can be achieved that with low material use the to-be-formed bridge exhibits sufficient stability for the welding connection.

According to one exemplary embodiment, the pockets are punched. The pockets can thereby be particularly suitably produced, since punching is a simple and rapid manufacturing process.

According to a further aspect of the disclosure a sheet metal cage is provided, in particular for a needle roller bearing, that includes at least one of the above-described bearing cage segments. Here the at least one bearing cage segment or the plurality of bearing cage segments are connected at their joint edges via a material-bonded connection, in particular welded. The sheet metal cage can thus be manufactured particularly advantageously overall. A laser welding or an electrical resistance welding is particularly suitable here as welding. It can thus be achieved that the weld seam is particularly small. The sheet metal cage can be configured single-row or multi-row.

Yet a further aspect of the disclosure includes a method of forming a bearing cage segment, which method includes punching a plurality of openings in a sheet metal band to form a plurality of pockets separated by a plurality of bridges, the bridges having a length direction transverse to a length direction of the band and having a width in the length direction of the band, and having a thickness in a direction perpendicular the length direction and to the width, and laser cutting the sheet metal band along one of the plurality of bridges transversely to the length direction of the band to form a joint edge.

Another aspect of the disclosure comprises a method of forming a bearing cage segment that includes determining a path of a periphery of the bearing cage segment on a metal sheet and punching a plurality of openings in the metal sheet inside the path to form a plurality of pockets separated by a plurality of bridges. The plurality of pockets are aligned in a first direction, the bridges have a length direction transverse to the first direction and a width in the first direction and a thickness in a direction perpendicular the first direction and to the width. The method also includes laser cutting at least a portion of the path, the portion including a first section extending transversely to the first direction and comprising a first joint edge, and a second section extending transversely to the first direction and comprising a second joint edge. The laser cutting is performed such that a distance from the first joint edge to a closest one of the plurality of openings is greater than or equal to one half the width of the bridges and less than the width of the bridges.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers. The direction designations used in the following—axial, radial, circumferential—always refer to the finished bearing cage.

Figure 1:
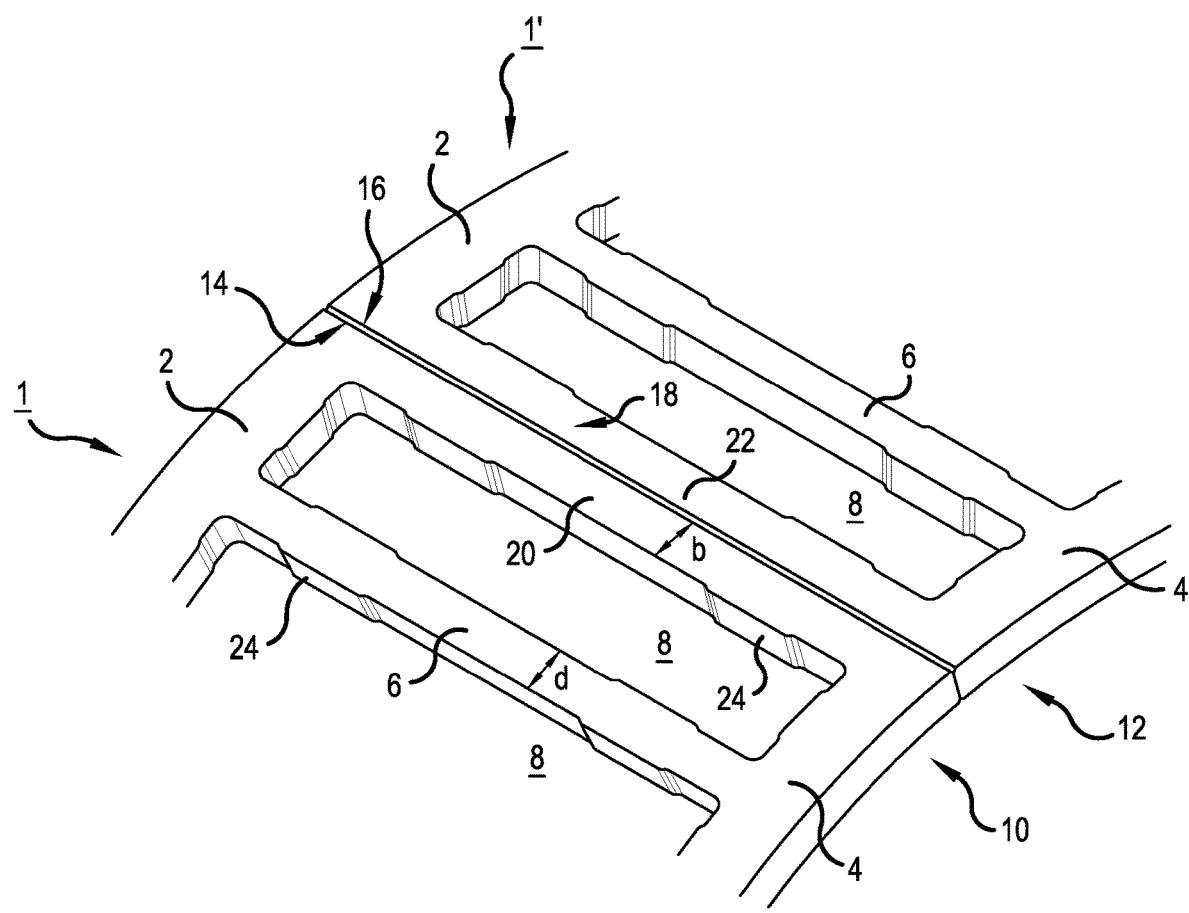
FIG. 1 is a perspective view of a connecting region in an exemplary embodiment of a bearing cage segment according to the present disclosure.

FIG. 1 shows an exemplary embodiment of at least one bearing cage segment 1 of a sheet metal cage in the joint region between a first bearing cage segment end 10 and a second bearing cage segment end 12. Here the sheet metal cage can be formed from a single bearing cage segment 1, so that the bearing cage-segment ends 10, 12, also referred to here in the following simply as "ends" 10, 12, are two circumferential ends of only one bearing cage segment 1. Alternatively the sheet metal cage can include a plurality of bearing cage segments, wherein the first end 10 is one end of a first bearing cage segment 1, and the second end 12 is one end of a second correspondingly designed bearing cage segment 1'.

For the sake of simplicity it is assumed here in the following that two bearing cage segments 1, 1' abut against each other at their ends 10, 12. The case that the first end 10 and the second end 12 are formed by the same bearing cage segment 1 obviously arises in an analogous manner.

Each bearing cage segment 1, 1' includes a first ring section 2 and a second ring section 4, and a plurality of bridges 6 connecting the first ring section 2 and the second ring section 4 to each other. Instead of the single-row design of the bearing cage segment 1 depicted here, the bearing cage segment 1 can also be configured multi-row, and would then include a first, a second, and further ring sections that are each connected to each other by bridges.

A pocket 8 for receiving at least one rolling element is respectively formed between the bridges 6. In the example shown the sheet metal cage is a needle-roller-bearing cage, and the pockets 8 are each configured for receiving a needle-shaped rolling element.

Each bearing cage segment 1, 1' includes on its first ends 10, 12 a joint edge 14, 16 directed in the circumferential direction, which joint edge 14, 16 is configured to be connected to the respective other joint edge 16, 14 that is formed here in an analogous manner on the second end 12.

The joint edges 14, 16 are preferably connected to each other via a connection, in particular a material-bonded connection, here a weld connection. Here a laser welding or an electrical resistance welding is suitable in particular for producing the connection.

As can be seen from the perspective representation of FIG. 1, the joint edge 14 is disposed in the region of a bridge 18 to be formed by this connection, here also referred to as "welding bridge" 18. Accordingly a first "partial bridge" 20 is formed by the first end 10, and a corresponding second partial bridge 22 is formed by the second end 12, wherein due to the connection of the joint edges 14, 16 these partial bridges 20, 22 form the to-be-formed bridge 18 or are assembled into the to-be-formed bridge 18.

Since the joint edge is formed on the partial bridge 20, 22, a particularly large contact or connecting surface can be achieved, and as a result a particularly stable and reliable connection can be achieved.

The partial bridges 20, 22 each preferably have a width b, measured in the circumferential direction, for which the following applies: $0.5\,d \leq b \leq d$ wherein d is the width of the "normal" bridges 6.

The joint edges 14, 16 are formed by laser cutting. In this way the joint edges 14, 16 can be shaped so precisely that a post-processing for suitability as a welding surface is no longer required. Here the surface is directly cleaned by the laser cutting process.

The pockets 8 can all be formed by a punching.

As can be seen from FIG. 1, guide surfaces 24 of the pockets 8, which guide surfaces 24 are for guiding the rolling elements, can be formed on the bridges 6, also on the partial bridges 20, 22, and on the ring sections 2, 4. These guide surfaces 24 can be formed, for example, by the punching of the pockets 8.

Figure 2:
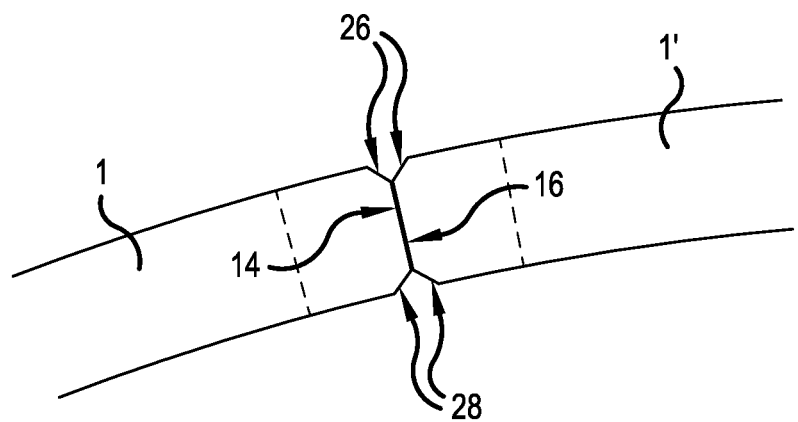
FIG. 2 is a cross-sectional view of two mutually contacting joint-edge regions of a bearing cage segment of the present disclosure prior to welding.

FIG. 2 shows a cross-sectional representation in the region of the connection of the joint edges 14, 16, wherein a state is shown wherein the joint edges 14, 16 contact, but are not yet welded.

Figure 3:
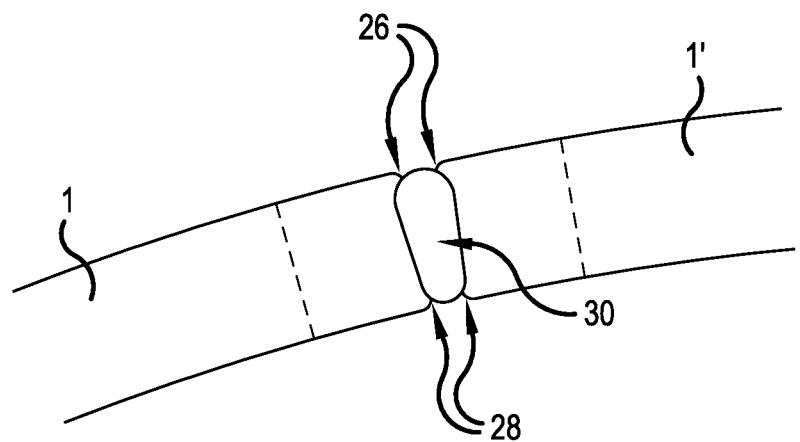
FIG. 3 is a view corresponding to that of FIG. 2 after welding.

As can be seen from FIG. 2, the joint edges 14, 16 also include a first chamfer 26 on the radially outer side, and a second chamfer 28 on the radially inner side. The chamfers 26, 28 serve to receive a radial or axial material accumulation, for example, an upper bead, as could arise due to the welding process. In FIG. 3 the state is shown after the welding. The weld seam 30 formed by the welding can be seen here. Due to the chamfers 26, 28 no projections are formed.

The chamfers 26, 28 are preferably produced by a reshaping, for example, rolling or milling. The laser cutting and the reshaping preferably occur with the aid of one and the same machine so that in particular the bearing cage segment 1 need not be transported to a further tool to form the chamfers 26, 28.

In summary a bearing cage segment is provided that includes a joint edge that is configured to be connected to another joint edge. Here the joint edge is disposed in the region of a bridge to be formed by the connection, so that a particularly large connecting surface is formed. The bearing cage segment is therefore particularly suitable for producing a reliable connection for forming a bearing cage, which is subjected in particular to high loads. The joint edge is laser-cut and is directly suitable for a weld connection.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cage segments.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1, 1' Bearing cage segment
2 First ring section
4 Second ring section
6 Bridges
8 Pockets
10 First bearing cage segment end
12 Second bearing cage segment end
14, 16 Joint edges
18 To-be-formed bridge
20, 22 Partial bridge
24 Guide surfaces
26 First chamfer
28 Second chamfer
30 Weld seam

What is claimed is:

1. A method of forming a bearing cage segment comprising:
    punching a plurality of openings in a sheet metal band to form a plurality of pockets and to form a plurality of bridges, the bridges having a length direction transverse to a length direction of the band and having a width in the length direction of the band, and having a thickness in a direction perpendicular the length direction and to the width, and
    laser cutting the sheet metal band along a first one of the plurality of bridges transversely to the length direction of the band to form a first joint edge.

2. The method according to claim 1, including chamfering the first joint edge.

3. The method according to claim 1, including chamfering the first joint edge along the width direction.

4. The method according to claim 3, wherein the chamfering comprises rolling or milling the first joint edge.

5. The method according to claim 1, wherein the laser cutting comprises cutting the one of the plurality of bridges to form a partial bridge having a width greater than or equal to one half the width of the bridge.

6. The method according to claim 1, including materially bonding the first joint edge to a second joint edge of the sheet metal band or to a joint edge of another sheet metal band.

7. The method according to claim 1, including welding the first joint edge to a second joint edge of the sheet metal band or to a joint edge of another sheet metal band.

8. The method according to claim 1, including laser welding the first joint edge to a second joint edge of the sheet metal band or to a joint edge of another sheet metal band.

9. The method according to claim 1, including resistance welding the first joint edge to a second joint edge of the sheet metal band or to a joint edge of another sheet metal band.

10. The method according to claim 1,
wherein the punching the plurality of openings comprises punching the plurality openings such that the plurality of openings are configured to receive needle-roller bearings.

11. The method according to claim 1,
including chamfering the first joint edge in the width direction by rolling or milling the first joint edge, and
welding the first joint edge to a second joint edge of the sheet metal band or to a joint edge of another sheet metal band,
wherein the laser cutting comprises cutting the one of the plurality of bridges to form a partial bridge having a width greater than or equal to one half of the width of the bridge.

12. The method according to claim 1, including welding the first joint edge to a second joint edge of the sheet metal band or to a joint edge of another sheet metal band without post-processing the first joint edge.

13. The method according to claim 1, including
placing a surface formed by the laser cutting of the first joint edge in direct contact with a second joint edge of the sheet metal band or in direct contact with a joint edge of another sheet metal band, and
welding the first joint edge to the second joint edge or to the joint edge of the another sheet metal band.

14. A method comprising:
determining a path of a periphery of a to-be-formed bearing cage segment on a metal sheet;
after determining the path of the periphery, punching a plurality of openings in the metal sheet inside the path to form a plurality of pockets separated by a plurality of bridges, the plurality of pockets being aligned in a first direction, the bridges having a length direction transverse to the first direction and having a width in the first direction, and having a thickness in a direction perpendicular the first direction and to the width; and
after punching the plurality of openings, laser cutting the path or only a portion of the path, the path or only the portion of the path including a first section extending transversely to the first direction, the first section comprising a first joint edge, and a second section extending transversely to the first direction and comprising a second joint edge,
wherein the laser cutting is performed such that a first distance from the first joint edge to a first one of the plurality of openings closest to the first joint edge is greater than or equal to one half the width of the bridges and less than the width of the bridges and such that a second distance from the second joint edge to a second one of the plurality of openings closest to the second joint edge is greater than or equal to one half the width of the bridges and less than the width of the bridges.

15. The method according to claim 14,
wherein when only the portion of the path is laser cut, further including separating the bearing cage segment from the metal sheet along the path.

16. The method according to claim 14, including chamfering the first joint edge.

17. The method according to claim 16, wherein the chamfering comprises rolling or milling the first joint edge.

18. The method according to claim 14, including welding the first joint edge to the second joint edge.

19. The method according to claim 14, including laser welding the first joint edge to the second joint edge.

20. The method according to claim 14, including welding the first joint edge to a joint edge of another bearing cage segment.

* * * * *